(12) United States Patent
Fujita et al.

(10) Patent No.: US 6,346,580 B1
(45) Date of Patent: Feb. 12, 2002

(54) THERMOPLASTIC RESIN COMPOSITION

(75) Inventors: Masayuki Fujita, Ichihara; Kenji Atarashi, Edogawa-ku, both of (JP)

(73) Assignee: Sumitomo Chemical Co., Ltd., Osaka (JP)

( * ) Notice: Subject to any disclaimer, the term of this patent is extended or adjusted under 35 U.S.C. 154(b) by 0 days.

(21) Appl. No.: 09/663,386

(22) Filed: Sep. 15, 2000

(30) Foreign Application Priority Data

Sep. 17, 1999 (JP) ............................................. 11-263931

(51) Int. Cl.⁷ ............................. C08L 23/12; C08L 23/16
(52) U.S. Cl. ...................... 525/240; 526/348; 526/351
(58) Field of Search .......................... 525/240; 526/348, 526/351

(56) References Cited

U.S. PATENT DOCUMENTS

| | | |
|---|---|---|
| 5,594,080 A | 1/1997 | Waymouth et al. |
| 5,969,070 A | 10/1999 | Waymouth et al. |
| 6,153,710 A | * 11/2000 | Saito et al. |

FOREIGN PATENT DOCUMENTS

| | | |
|---|---|---|
| JP | 11-71428 | 3/1999 |
| WO | WO-95/25757 | 9/1995 |
| WO | WO-96/20225 | 7/1996 |

* cited by examiner

*Primary Examiner*—Tae H. Yoon
(74) *Attorney, Agent, or Firm*—Fitch, Even, Tabin & Flannery

(57) ABSTRACT

A thermoplastic resin composition comprising 5 to 50% by weight of a propylene homopolymer(A) having an intrinsic viscosity measured in a tetralin solution at 135° C. of 1.2 dl/g or more, having a boiling heptane-insoluble portion content of 5.0 to 50.0% by weight and having an intrinsic viscosity measured in a tetralin solution at 135° C. of the boiling heptane-insoluble portion of 4.3 dl/g or less, and 95 to 50% by weight of a propylene-based resin(B) consisting of a propylene homopolymer(B1) having an isotactic pentad fraction of 0.970 or more or a composition consisting of at least 65% by weight of the propylene homopolymer(B1) and up to 35% by weight of an ethylene-propylene random copolymer(B2).

11 Claims, No Drawings

THERMOPLASTIC RESIN COMPOSITION

BACKGROUND OF THE INVENTION

1. Field of the Invention

The present invention relates to a thermoplastic resin composition having a good balance in rigidity, toughness and flowability.

2. Description of the Related Art

A propylene-based resin has been widely used as materials for an automobile and the like, because it is excellent in hardness, thermal resistance and the like, can be easily molded to an arbitrary form by a method such as an injection molding, an extrusion molding or the like, and is not expensive in cost, etc.

It has been recently desired to integrally mold a large size molded article such as, for example, a bumper or the like and to thin the thickness thereof for light weight. The improvement of flowability, rigidity, and toughness such as tensile elongation or the like is required for realizing it.

When the flowability is increased by adding a component such as a mineral oil, having a lower melting point than a resin, the hardness and thermal resistance which the propylene-based resin inherently has are lowered. When the flowability is increased by lowering the molecular weight of a resin, the resin becomes brittle and inferior in tensile elongation, etc. It is well known to add an ethylene-propylene copolymer rubber and the like in order to maintain the tensile elongation, etc., but the rigidity of the resin is largely lowered.

Therefore, the balance in rigidity, tensile elongation and flowability of the propylene-based resin has not enough satisfied needs in market.

SUMMARY OF THE INVENTION

An object of the present invention is to provide a propylene-based resin composition having a good balance in flowability, rigidity and tensile elongation.

Namely, the present invention provides to a thermoplastic resin composition comprising 5 to 50% by weight of a propylene homopolymer(A) having an intrinsic viscosity measured in a tetralin solution at 135° C. of 1.2 dl/g or more, having a boiling heptane-insoluble portion content of 5.0 to 50.0% by weight and having an intrinsic viscosity measure in a tetralin solution at 135° C. of the boiling heptane-insoluble portion of 4.3 dl/g or less, and 95 to 50% by weight of a propylene-based resin(B) consisting of a propylene homopolymer(B1) having an isotactic pentad fraction of 0.970 or more or a composition consisting of at least 65% by weight of the propylene homopolymer(B1) and up to 35% by weight of an ethylene-propylene random copolymer(B2), the total of (A) and (B) being 100% by weight.

The present invention is illustrated in detail below.

DETAILED DESCRIPTION OF THE INVENTION (A) Propylene homopolymer

The propylene homopolymer (A) used in the present invention has an intrinsic viscosity measured in tetralin at 135° C. of 1.2 dl/g or more, preferably 1.3 to 3.5 dl/g and more preferably 1.5 to 3.0 dl/g. When the intrinsic viscosity is within the range, it is preferable because a thermoplastic resin composition excellent in tensile elongation can be obtained.

The propylene homopolymer (A) contains a boiling heptane-insoluble portion of 5.0 to 50.0% by weight, and preferably 5.0 to 40.0% by weight. When the content is within the range, it is preferable because a thermoplastic resin composition having a good balance between rigidity and tensile elongation can be obtained.

The propylene homopolymer (A) has an intrinsic viscosity measured in tetralin at 135° C. of the boiling heptane-insoluble portion of 4.3 dl/g or less, and preferably 2.5 to 4.0 dl/g. When the intrinsic viscosity is within the range, it is preferable because a thermoplastic resin composition excellent in tensile elongation and flowability can be obtained.

The melting point of the propylene homopolymer (A) is not particularly limited, and 140 to 155° C. is preferable and 145 to 155° C. is more preferable. When the melting point is within the above range, it is preferable because a thermoplastic resin composition having a good balance between rigidity and tensile elongation can be obtained.

Further, there is no specific limitation concerning the isotactic pentad fraction of the propylene homopolymer (A), and 0.300–0.800 is preferable, 0.320–0.750 is more preferable and 0.320–0.700 is further preferable. When the isotactic pentad fraction is within the above range, it is preferable because a thermoplastic resin composition having a good balance between rigidity and tensile elongation can be obtained.

Herein, the isotactic pentad fraction is the fraction of isotactic chains having pentad units in a propylene polymer molecular chain measured by using the method published in Macromolecules, vol.6, 925(1973) by A.Zambelli et al, that is, by using $^{13}$C-NMR, and in other words, the fraction of propylene monomer units being at the center of a chain wherein five propylene monomer units are consecutively meso-bonded. Herein, the assignment of NMR absorption peaks is determined in accordance with Macromolecules, Vol.8, 687(1975) published thereafter.

The content of the 20° C. xylene-soluble portion of the propylene homopolymer (A) is not particularly limited, and 20 to 80% by weight is preferable and 35 to 80% by weight is more preferable. When the content is within the above range, it is preferable because a thermoplastic resin composition having a good balance in rigidity and tensile elongation can be obtained.

The propylene homopolymer (A) can be obtained, for example, by homopolymerizing propylene in the presence of a polymerization catalyst obtained by bringing a metallocene compound represented by the general formula [I] described below, into contact with an activating co-catalyst:

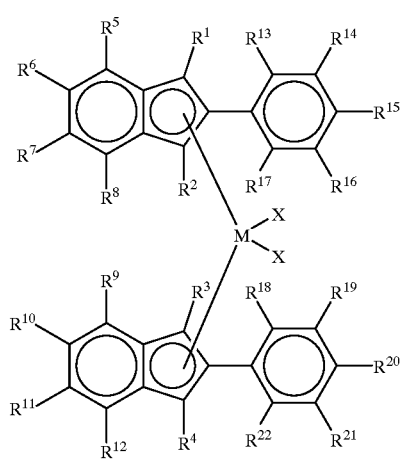

[I]

wherein each of $R^1$ to $R^{22}$ is independently a hydrogen atom, a halogen atom, an alkyl group, an aryl group, an aralkyl group or a substituted silyl group, $R^1$ to $R^{22}$ may be mutually the same or different, and arbitrary two adjacent $R^1$ to $R^{22}$ which are in the same ring may form a ring of 5 to 8 carbon atoms, M is a transition metal atom of the IV Group of the Periodic Table of Element, X is a hydrogen atom, a halogen atom, an alkyl group, an aryl group, an aralkyl group or an alkoxy group, and two X's may be the same or different.

In the metallocene compound represented by the above-mentioned general formula [I], M represents a transition metal atom of the IV Group of the Periodic Table of Element (IUPAC Inorganic Chemistry Nomenclature: Revised Edition 1989), and a titanium atom, a zirconium atom or a hafnium atom is preferable and in particular, a zirconium atom is preferable.

The halogen atom in the substituents, $R^1$ to $R^{22}$, or X includes a fluorine atom, a chlorine atom and an iodine atom, and in particular, a fluorine atom is preferable.

The alkyl group in the substituents, $R^1$ to $R^{22}$, or X preferably includes an alkyl group having 1 to 20 carbon atoms. Examples thereof include a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-octyl group, a n-decyl group, a n-dodecyl group, a n-pentadecyl group, a n-eicosyl group and the like, and a methyl group, an ethyl group, an isopropyl group, a tert-butyl group, an isobutyl group or a n-pentyl group is more preferable.

All of these alkyl groups may be substituted with a halogen atom such as a fluorine atom, a chlorine atom, a bromine atom or an iodine atom. Examples of the alkyl group having 1 to 10 carbon atoms which is substituted with the halogen atom include a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group, a perbromopropyl group and the like.

Further, all of these alkyl groups may be partially substituted with an alkoxy group such as a methoxy group, an ethoxy group or the like, an aryloxy group such as a phenoxy group or the like or an aralkyloxy group such as a benzyloxy group or the like, etc.

As the aryl group in the substituents, $R^1$ to $R^{22}$, or X, an aryl group having 6 to 20 carbon atoms is preferable. Examples include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group and the like, and a phenyl group is more preferable.

All of these aryl groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

As the aralkyl group in the substituents, $R^1$ to $R^{22}$, or X, an aralkyl group having 7 to 20 carbon atoms is preferable. Examples include a benzyl group, a (2-methylphenyl)methyl group, a (3-methylphenyl)methyl group, a (4-methylphenyl) methyl group, a (2,3-dimethylphenyl)methyl group, a (2,4-dimethylphenyl)methyl group, a (2,5-dimethylphenyl) methyl group, a (2,6-dimethylphenyl)methyl group, a (3,4-dimethylphenyl)methyl group, a (3,5-dimethylphenyl) methyl group, a (2,3,4-timethylphenyl)methyl group, a (2,3,5-timethylphenyl)methyl group, a (2,3,6-timethylphenyl) methyl group, a (3,4,5-timethylphenyl)methyl group, a (2,4,6-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl) methyl group, an (ethylphenyl)methyl group, a (n-propylphenyl)methyl group, an (isopropylphenyl)methyl group, a (n-butylphenyl)methyl group, a (sec-butylphenyl) methyl group, a (tert-butylphenyl)methyl group, a (n-pentylphenyl)methyl group, a (neopentylphenyl)methyl group, a (n-hexylphenyl)methyl group, a (n-octylphenyl) methyl group, a (n-decylphenyl)methyl group, a (n-dodecylphenyl)methyl group, a naphthylmethyl group, an anthracenylmethyl group and the like, and a benzyl group is more preferable.

All of these aralkyl groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

The substituted silyl group in the substituents, $R^1$ to $R^{22}$ is a silyl group substituted with a hydrocarbon group. Examples of the hydrocarbon group include alkyl groups having 1 to 10 carbon atoms such as a methyl group, an ethyl group, a n-propyl group, an isopropyl group, a n-butyl group, a sec-butyl group, a tert-butyl group, an isobutyl group, a n-pentyl group, a n-hexyl group, a cyclohexyl group and the like, aryl groups such as a phenyl group and the like, etc. Examples of the substituted silyl group having 1 to 20 carbon atoms include mono-substituted silyl groups having 1 to 20 carbon atoms such as a methylsilyl group, an ethylsilyl group, a phenylsilyl group and the like, di-substituted silyl groups having 2 to 20 carbon atoms such as a dimethylsilyl group, a diethylsilyl group, a diphenylsilyl group and the like, tri-substituted silyl groups having 3 to 20 carbon atoms such as a trimethylsilyl group, a triethylsilyl group, a tri-n-propylsilyl group, a triisopropylsilyl group, a tri-n-butylsilyl group, a tri-sec-butylsilyl group, a tri-tert-butylsilyl group, a triisobutylsilyl group, a tert-butyldimethylsilyl group, a tri-n-pentylsilyl group, a tri-n-hexylsilyl group, a tricyclohexylsilyl group, a triphenylsilyl group and the like, etc. A trimethylsilyl group, a tert-butyldimethylsilyl group or a triphenylsilyl group is preferable.

All of these substituted silyl groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

An alkoxy group having 1 to 20 carbon atoms is preferable as the alkoxy group in the substituent X, and examples thereof include a methoxy group, an ethoxy group, a n-propoxy, an isopropoxy, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group, a n-eicosoxy group and the like. A methoxy group, an ethoxy group, an isopropoxy or a tert-butoxy group is more preferable.

All of these alkoxy groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like.

In particular, a hydrogen atom is preferable as $R^1$ to $R^{12}$ in the above-mentioned general formula [I]. Each of $R^{13}$ to $R^{22}$ is preferably a hydrogen atom, a halogen atom or an alkyl group, independently, more preferably a hydrogen atom, a fluorine atom, a methyl group or a trifluoromethyl group, independently, and in particular, a hydrogen atom is preferable. Further, X is preferably a halogen atom, an alkyl group or an alkoxy group.

In particular, the metallocene compound represented by the general formula [I] is preferably bis(2-phenylindenyl) zirconium dichloride, bis(2-phenylindenyl)zirconium dimethyl, bis[2-(3,5-dimethylphenyl)indenyl]zirconium dichloride, bis[2-(3,5-bis-trifluoromethylphenyl)indenyl] zirconium dichloride, bis[2-(4-fluorophenyl)indenyl] zirconium dichloride, bis[2-(2,3,4,5-tetrafluorophenyl) indenyl]zirconium dichloride, bis[2-(2,3,4,5,6-pentafluorophenyl)indenyl]zirconium dichloride, or (2-phenylindenyl)[2-(3,5-bis-trifluoromethylphenyl) indenyl]zirconium dichloride. Bis(2-phenylindenyl) zirconium dichloride is most preferable.

These metallocene compounds may be used alone, or in combination of two or more.

The polymerization catalyst is obtained by bringing a metallocene compound in contact with the activating co-catalyst. The activating co-catalyst is not particularly limited so far as it activates the metallocene compound to form an addition polymerization catalyst, and an organoaluminumoxy compound is suitably used.

As the organoaluminumoxy compound, known organoaluminumoxy compounds (aluminoxanes) can be used. For example, those obtained by reacting one kind of trialkylaluminum with water and those obtained by reacting two or more kinds of trialkylaluminums with water, and the like are used. Specific examples thereof include methylaluminoxane, ethylaluminoxane, n-propylaluminoxane, isopropylaluminoxane, n-butylaluminoxane, isobutylaluminoxane, methylethylaluminoxane, methylbutylaluminoxane, methylisobutylaluminoxane and the like. Among them, methylisobutylaluminoxane is most preferably used.

These organoaluminumoxy compounds may be used alone or in combination of two or more.

Further, as the organoaluminumoxy compound, a modified organoaluminumoxy compound obtained by further reacting the organoaluminumoxy compound with water and/ or a compound having a hydroxy group, can be used. The compound having a hydroxy group is a compound having at least one hydroxy group in its molecule, and an organic compound having a hydroxy group is preferable. An alcohol compound, a phenol compound or a silanol compound is more preferable.

As the alcohol compound, a compound represented by the general formula described below is preferable.

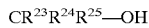

$CR^{23}R^{24}R^{25}$—OH (wherein each of $R^{23}$, $R^{24}$ and $R^{25}$ represents a hydrogen atom or a hydrocarbon group having 1 to 20 carbon atoms, independently, and they may be mutually the same or different.)

The hydrocarbon group in the above-mentioned general formula includes an alkyl group, an aralkyl group, an aryl group and the like, and an alkyl group, an aralkyl group, an aryl group and the like may be substituted with a halogen atom.

A tertiary alcohol or an alcohol substituted with a halogen atom is preferable, and in particular, tert-butyl alcohol, triphenylmethanol, tricyclohexylmethanol or 1,1,1,3,3,3-hexafluoroisopropanol is preferable.

As the phenol compound, a non-substituted phenol or substituted phenol can be used. The substituent includes, for example, a halogen atom, and an alkyl, aralkyl, ary, silyl, alkoxy, aralkyloxy, aryloxy and silyloxy group which may be substituted with a halogen atom.

Specific examples of the phenol compound include 2-substituted phenols such as 2-methylphenol, 2-ethylphenol, 2-n-butylphenol, 2-isobutylphenol, 2-tert-butylphenol, 2-n-propylphenol, 2-isopropylphenol, 2-phenylphenol, 2-fluorophenol, 2-chlorophenol, 2-bromophenol and the like; 3-substituted phenols such as 3-methylphenol, 3-ethylphenol, 3-n-butylphenol, 3-isobutylphenol, 3-tert-butylphenol, 3-n-propylphenol, 3-isopropylphenol, 3-phenylphenol, 3-fluorophenol, 3-chlorophenol, 3-bromophenol and the like; 4-substituted phenols such as 4-methylphenol, 4-ethylphenol, 4-n-butylphenol, 4-isobutylphenol, 4-tert-butylphenol, 4-n-propylphenol, 4-isopropylphenol, 4-phenylphenol, 4-fluorophenol, 4-chlorophenol, 4-bromophenol and the like; 2,6-substituted phenols such as 2,6-dimethylphenol, 2,6-diethylphenol, 2,6-di-n-butylphenol, 2,6-diisobutylphenol, 2,6-di-tert-butylphenol, 2,6-di-n-propylphenol, 2,6-diisopropylphenol, 2,6-diphenylphenol, 2,6-difluorophenol, 2,6-dichlorophenol, 2,6-dibromophenol and the like; 2,6,X-substituted phenols (X is one or more numerals selected from 3, 4 and 5) such as 2,4,6-trimethylphenol, 2,6-di-tert-butyl-4-methylphenol, 2,3,5,6-tetrafluorophenol, pentafluorophenol and the like; 2,3-substituted phenols such as 2,3-difluorophenol and the like; 2,4-substituted phenols such as 2,4-difluorophenol and the like; 3,5-substituted phenols such as 3,5-dimethylphenol, 3,5-diethylphenol, 3,5-di-n-butylphenol, 3,5-diisobutylphenol, 3,5-di-tert-butylphenol, 3,5-di-n-propylphenol, 3,5-diisopropylphenol, 3,5-diphenylphenol, 3,5-difluorophenol, 3,5-dichlorophenol, 3,5-dibromophenol and the like; phenols having 2 or more hydroxy groups such as catechol, resorcinol, hydroquinone, bisphenol-A, 2,2-thiobis-6-tert-butyl-4-methylphenol and the like; etc.

As the phenol compound, a halogenated phenol or a phenol having bulky substituents at 2,6-position is preferable, and in particular, pentafluorophenol is preferable.

Further, as the silanol compound, a compound indicated by the general formula described below is preferable.

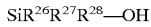

$SiR^{26}R^{27}R^{28}$—OH (wherein each of $R^{26}$, $R^{27}$ and $R^{28}$ represents a hydrogen atom or a hydrocarbon group having 1 to 20 carbon atoms, independently, and they may be mutually the same or different)

The hydrocarbon group in the above-mentioned general formula includes an alkyl group, an aralkyl group, an aryl group and the like, and an alkyl group, an aralkyl group, an aryl group and the like may be substituted with a halogen atom.

A tertiary silanol or a silanol substituted with a halogen atom is preferable, and in particular, triphenylsilanol or tricyclohexylsilanol is preferable.

As the compound having a hydroxy group, an alcohol compound or a phenol compound is preferable, and in particular, pentafluorophenol, triphenylmethanol, tricyclohexylmethanol or 1,1,1,3,3,3-hexafluoroisopropanol is preferable.

These compounds having a hydroxyl group may be used alone, or in combination of 2 or more.

The above-mentioned modified aluminum-oxy compound is obtained by further reacting an organoaluminum-oxy compound with water and/or a compound having a hydroxyl group. The molar ratio of the aluminum-oxy compound (in terms of Al atom) to water and/or a compound having a hydroxyl group used in the reaction is preferably 1:3 to 1:0.01, more preferably 1:1 to 1:0.05.

Such reaction is preferably carried out in an inactive gas atmosphere. The reaction temperature is not specifically limited, and is −80° C. to 200° C. and preferably −50° C. to 120° C. The reaction time is 1 minute to 12 hours and preferably 2 minutes to 1 hour. The reaction may be carried out in the absence or presence of a solvent. The solvent used is not specifically limited, and includes an aliphatic hydrocarbon solvent or an aromatic hydrocarbon solvent. Specific examples include hexane, heptane, benzene, toluene and the like.

The molar ratio of the organoaluminumoxy compound (converted to Al atom) to the metallocene compound used in polymerization is usually 50–10,000, preferably 100–5,000.

Further, as polymerization conditions, known conditions can be adopted.

As the propylene homopolymer used in the present invention, those having a so-called stereoblock structure in which an isotactic segment having a length of some extent enough to have a melting point of 140° C. or more and to form a crystal and an atactic segment having a certain degree of length exist in one molecular chain, are preferable.

(B) Propylene-based resin

The propylene-based resin(B) used in the present invention consists of 65 to 100% by weight of a propylene homopolymer(B1) having an isotactic pentad fraction of 0.970 or more (preferably 0.980 or more) and 0 to 35% by weight of an ethylene-propylene random copolymer(B2).

In detail, the propylene-based resin includes (1) a propylene homopolymer(B1) having an isotactic pentad fraction of 0.970 or more, alone, (2) a block copolymer consisting of a propylene homopolymer portion(hereinafter, sometimes referred to simply as "propylene homopolymer") having an isotactic pentad fraction of 0.970 or more and a propylene-ethylene random copolymer portion (hereinafter, sometimes referred to simply as "propylene-ethylene random copolymer"), (3) a composition obtained by mechanically blending a propylene homopolymer having an isotactic pentad fraction of 0.970 or more with a propylene-ethylene random copolymer, and (4) a composition obtained by mechanically blending a block copolymer consisting of a propylene homopolymer having an isotactic pentad fraction of 0.970 or more and a propylene-ethylene random copolymer with a propylene homopolymer having an isotactic pentad fraction of 0.970 or more. In the case(4), the amount of the propylene homopolymer(B1) is the total amount of the propylene homopolymer in the block copolymer and the propylene homopolymer blended therewith and each of the propylene homopolymers satisfies definitions of the propylene homopolymer(B1).

Herein, the block copolymer means a composition obtained by polymerizing propylene in the presence of a stereoregular polymerization catalyst in a first step to produce a propylene homopolymer portion(B1), and copolymerizing propylene and ethylene in the presence of the catalyst and the propylene homopolymer produced in the first step, in a second step to produce an ethylene-propylene random copolymer portion(B2), and the block copolymer can be produced by a well-known method.

When the isotactic pentad fraction of the propylene homopolymer (B1) is 0.970 or more, the polymer is excellent in rigidity, heat resistance and the like.

The content of the propylene homopolymer (B1) in the propylene-ethylene block copolymer is determined from $^{13}$C-NMR spectrum based on a report (Macromolecules, 1982, 15, 1150–1152) by Kakugo et al.

When the intrinsic viscosity measured in tetralin at 135° C. of the above-mentioned propylene homopolymer portion (B1) is 0.5 to 1.3 dl/g, it is preferable because a thermoplastic resin composition having more superior in tensile elongation and impact strength is obtained and its molding cycle can be shortened because of superiority in flowability.

The propylene-based resin(B) preferably consists of the above-mentioned propylene homopolymer(B1) and an ethylene-propylene random copolymer(B2). The amount of the propylene homopolymer (B1) is preferably 65 to 95% by weight based on 100% by weight of the total of (B1) and (B2), and amount of the ethylene-propylene random copolymer(B2) is 5 to 35% by weight. It is more preferable that (B1) is 85 to 95% by weight and (B2) is 5 to 15% by weight. The weight ratio of ethylene unit to propylene unit in the random copolymer(B2) is preferably 20/80 to 60/40, and can be determined from $^{13}$C-NMR spectrum based on a report (Macromolecules, 1982, 15, 1150–1152) by Kakugo et al.

The intrinsic viscosity measured in a tetralin at 135° C. of the ethylene-propylene random copolymer (B2) is preferably 4.5 dl/g or more, and more preferably 5.0 dl/g or more.

When the intrinsic viscosity is within the range, it is preferable because troubles such as a flow mark and the like in injection molding hardly occur.

More preferably, the propylene-based resin is the block copolymer consisting of a propylene homopolymer(B1) having an isotactic pentad fraction of 0.970 or more and a propylene-ethylene random copolymer(B2) in the above case (2), and the composition obtained by mechanically blending a block copolymer consisting of a propylene homopolymer having an isotactic pentad fraction of 0.970 or more and a propylene-ethylene random copolymer with a propylene homopolymer having an isotactic pentad fraction of 0.970 or more in the above case(4).

The intrinsic viscosity $[\eta]_{EP}$ in tetralin solution at 135° C. of the ethylene-propylene random copolymer (B2) in the ethylene-propylene block copolymer can be determined by calculation from the following equation, by defining the intrinsic viscosity $[\eta]_P$ in a tetralin solution of a propylene homopolymer obtained in the first step taken out from the polymerization vessel, as the intrinsic viscosity of the propylene homopolymer (B1), and by using the intrinsic viscosity $[\eta]_T$ in tetralin solution at 135° C. determined by measuring the total ethylene-propylene block copolymer and the content X of the ethylene-propylene random copolymer (B2) contained in the ethylene-propylene block copolymer, which was determined from $^{13}$C-NMR spectrum based on a report (Macromolecules, 1982, 15, 1150–1152) by Kakugo et al.

$$[\eta]_{EP}=[\eta]_T/X-(1-X)/X[\eta]_P,$$

$[\eta]_P$: The intrinsic viscosity (dl/g) of the propylene homopolymer (B1), $[\eta]_T$: The intrinsic viscosity (dl/g) of the total ethylene-propylene block copolymer.

The ethylene-propylene block copolymer can be produced by a slurry polymerization process, a gas phase polymerization process or the like. When it is used for a use for which a particularly high impact strength is required, it is suitable that the content of the ethylene-propylene random copolymer (B2) is made as high as possible, and the gas phase polymerization process is most suitable for the purpose. A propylene-based resin according to the gas phase polymerization process can be produced, for example, by the method described in JP-A-61-287917.

The polymerization amount at the second step in the slurry polymerization process is suitably produced within a range of 10 to 30% by weight, and that in the gas phase polymerization process is suitably produced within a range of 10 to 70% by weight. In the gas phase polymerization process, the ethylene-propylene block copolymer can be more easily produced because a rinsing step with a solvent is unnecessary. It is preferable because it is not only from the industrial viewpoint of reducing the production cost, but also from the environmental viewpoint of not using a large amount of solvent. In the gas phase polymerization process, an ethylene-propylene block copolymer having more polymerization amount in the second step can be produced by the method described in JP-A-01-98604.

The thermoplastic resin composition of the present invention is a thermoplastic resin composition comprising 5 to 50% by weight (preferably 5 to 35% by weight) of the above-mentioned propylene homopolymer (A) and 95 to 50% by weight (preferably 95 to 65% by weight) of the above-mentioned propylene-based resin (B). Herein, the total of the component (A) and the component (B) is 100% by weight.

As the production method of the thermoplastic resin composition of the present invention, various methods generally used for mixing resins can be used without any limitation.

For example, a method of mixing powdery or pellet-like (A), (B), and if necessary, other additives with a tumbler or a Henschel mixer and then melt-kneading the resulting mixture with an extruder, is suitable. A single-screw extruder, a twin-screw extruder, a Banbury mixer, a hot roll or the like can be used for the melt-kneading. The temperature suitable for the melt-kneading is 170 to 250° C. and the kneading time is usually 1 to 20 minutes. Further, in the melt-kneading, additives such as talc, fibrous magnesium oxy sulfate, antioxidants, UV absorbers, lubricants, pigments, antistatic agents, copper inhibitors, flame retardants, neutralizers, foaming agents, plasticizers, nucleating agents, foaming preventing agents, crosslinking agents and the like, may be properly blended in addition to the basic components.

The present invention is illustrated by Examples below, but is not limited thereto.

The measurement methods of physical properties in Examples are shown below:

(1) Melt flow index (MFR)

It was measured at 230° C. under a load of 2.16 kg according to JIS-K-6758.

(2) Bending test

It was measured according to JIS-K-7106. Test pieces prepared by hot press-molding were used. The thickness of the test piece was 1 mm, the measurement temperature was 23° C.

(3) Tensile elongation

It was measured in accordance with JIS-K-7113. Test pieces prepared by hot press-molding were used. The measurement temperature was 23° C. and test speed was 50 mm/min.

(4) Weight ratio X of the ethylene-propylene random copolymer in the propylene-based resin (B) to the total It was determined from $^{13}$C-NMR spectrum based on the report (Macromolecules, 1982, 15, 1150–1152) by Kakugo et al. A sample was prepared by homogeneously dissolving about 200 mg of the propylene-based resin (B) in 3 ml of o-dichlorobenzene in a 10 mm φ test tube, and the $^{13}$C-NMR spectrum of the sample was measured under the conditions described below.

Measurement temperature: 135° C.

Pulse repeating time: 10 seconds

Pulse width: 45°

Integral repeating times: 2500 times (5) Intrinsic viscosity [η]

By using an Ubbelohde type viscometer, reduced viscosities at three points of 0.1, 0.2 and 0.5 g/dl in concentration were measured. Intrinsic viscosity was determined according to a calculating method described in page 491 of "Polymer Solution, Polymer Experiment 11" (published by Kyoritsu Shuppan Limited, 1982), namely an extrapolation method of extrapolating the viscosity at a concentration of zero after reduced viscosities were plotted against concentrations. Tetralin was used as a solvent, and the measurement was carried out at a temperature of 135° C.

(6) Molecular weight and molecular weight distribution

Number average molecular weight and weight average molecular weight were measured by Gel Permeation Chromatography (GPC), and the measurement was carried out under the conditions shown below.

GPC: 150C type manufactured by Waters Company Ltd.

Column: Two columns of Shodex 80 MA manufactured by Showa Denko k.k.

Sample amount: 300 μl (a polymer concentration of 0.2% by weight)

Flow rate: 1 ml/min

Temperature: 135° C.

Solvent: o-dichlorobenzene

A calibration curve of elution volumes against molecular weights was prepared by using standard polystyrenes manufactured by Tosoh Corporation. A polystyrene-reduced weight average molecular weight (Mw) and polystyrene-reduced number average molecular weight (Mn) of the sample were determined by using the calibration curve. Further, the molecular weight distribution was evaluated by the ratio Mw/Mn of the weight average molecular weight Mw to the number average molecular weight Mn.

(7) Melting point (Tm)

It was measured using a differential scanning calorimeter (DSC) (DSC-V II, manufactured by Perkin Elmer Co., Ltd.) under the conditions below.

Raising temperature: from −50° C. to 200° C. (20° C./min.), retention for 5 minutes.

Cooling: from 200° C. to −50° C. (20° C./min.), retention for 5 minutes.

Measurement: from −50° C. to300° C. (raising temperature at 20° C. /min.).

(8) Isotactic pentad fraction of propylene homopolymer (A) (mmmm)

Into 3ml of a mixed solvent of o-dichlorobenzene/ deuterated-benzene (o-dichlorobenzene/deuterated-benzene=3/1(volume), 200 mg of a sample was dissolved, and $^{13}$C-NMR was measured using AC-250 manufactured by Brucker Co., Ltd. concerning Reference Example 3, and using AM-400 concerning Reference Examples 1,2,4 and 5.

(9) 20° C. xylene-soluble portion

After 3 g of a polymer was dissolved in 1 liter of boiling xylene, the solution was gradually cooled to 50° C. and then cooled to 20° C. while stirring in iced water. After the solution was allowed to stand at 20° C. for 12 hours, a polymer deposited was filtered for separation. The xylene was evaporated from the filtrate, the residue was dried under reduced pressure at 60° C., and thus obtained polymer soluble in 20° C. xylene was collected and weighed. The weight percentage of the soluble polymer to the whole polymer was calculated.

(10) Boiling heptane-insoluble portion Among 20° C. xylene-insoluble portion recovered in the above-mentioned (9), 0.5 g was charged in a columnar filter paper, a component insoluble in 200 ml of boiling n-heptane was filtered for separation using a Soxlet extractor.

The insoluble portion was dried under reduced pressure at 60° C., and the boiling heptane-insoluble portion was collected and weighed. The weight percentage of the insoluble portion to the whole polymer was calculated. Further, the intrinsic viscosity of the obtained sample was determined in accordance with the above-mentioned (6).

REFERENCE EXAMPLE 1

(Production of propylene homopolymer (A-1))

After the atmosphere of a 1-liter stainless steel autoclave was replaced with argon and 280 g of propylene was charged thereto, 15 mmol (molar number converted to Al atom; hereinafter, it is similar meaning) of MMAO-3A manufactured by TOSOH-AKZO Co., Ltd. (a toluene solution having a concentration converted to Al atom of 5.9% by weight; hereinafter, described as "MMAO-3A" in abbreviation) and 10 $\mu$mol of bis(2-phenylindenyl) zirconium dichloride which was dissolved in 5 ml of purified toluene, were charged in the autoclave, and polymerization was carried out at 30° C. for 1 hour.

Then, 10 ml of methanol was charged in the autoclave under pressure, and the polymerization was terminated. Then, the unreacted propylene was purged, the content in the autoclave was charged in 100 ml of acidic methanol, and a polymer deposited was filtered for separation and dried at 80° C. for about 2 hours. As a result, 54 g of the polypropylene A-1 was obtained. Physical properties of the polypropylene A-1 are shown in Table 1.

REFERENCE EXAMPLE 2

(Production of propylene homopolymer (A-2))

After the atmosphere of a 1 liter stainless steel autoclave was replaced with argon and 280 g of propylene was charged thereto, 15 mmol of MMAO-3A was charged, then 3 mmol of water was charged and the mixture was stirred for 10 minutes. After 3 mmol of pentafluorophenol which was dissolved in 1.5 ml of purified toluene was charged and the mixture was stirred for 10 minutes, 10 g mol of bis(2-phenylindenyl)zirconium dichloride which was dissolved in 5 ml of purified toluene was charged in the autoclave, and polymerization was carried out at 30° C. for 1 hour. Then, 10 ml of methanol was charged in the autoclave under pressure, and the polymerization was terminated. Then, the unreacted propylene was purged, the content in the autoclave was charged in 1000 ml of acidic methanol, and a polymer deposited was filtered for separation and dried at 80° C. for about 2 hours. As a result, 68 g of the polypropylene A-2 was obtained. Physical properties of the polypropylene A-2 are shown in Table 1.

REFERENCE EXAMPLE 3

(Preparation of propylene homopolymer (A-3))

After the atmosphere of a 1 liter stainless steel autoclave was replaced with argon and 280 g of propylene was charged thereto, 15 mmol of MMAO-3A was charged, then 3 mmol of water was charged and the mixture was stirred for 10 minutes. After 3 mmol of pentafluorophenol which was dissolved in 1.5 ml of purified toluene was charged and the mixture was stirred for 10 minutes, 7.5 $\mu$mol of bis(2-phenylindenyl)zirconium dichloride which was dissolved in 5 ml of purified toluene was charged in the autoclave, and polymerization was carried out at 30° C. for 1 hour. Then, 10 ml of methanol was charged in the autoclave under pressure, and the polymerization was terminated. Then, the unreacted propylene was purged, the content in the autoclave was charged in 1000 ml of acidic methanol, and a polymer deposited was filtered for separation and dried at 80° C. for about 2 hours. As a result, 65 g of the polypropylene A-3 was obtained. Physical properties of the polypropylene A-3 are shown in Table 1.

REFERENCE EXAMPLE 4

(Production of propylene homopolymer (A-4))

After the atmosphere of a 1 liter stainless steel autoclave was replaced with argon and 280 g of propylene was charged thereto, 15 mmol of MMAO-3A was charged, then 1.5 mmol of water was charged and the mixture was stirred for 10 minutes. After 4.5 mmol of pentafluorophenol which was dissolved in 2.25 ml of purified toluene was charged and the mixture was stirred for 10 minutes, 7.5 $\mu$mol of bis(2-phenylindenyl)zirconium dichloride which was dissolved in 5 ml of purified toluene was charged in the autoclave, and polymerization was carried out at 30° C. for 1 hour. Then, 10 ml of methanol was charged in the autoclave under pressure, and the polymerization was stopped. Then, the unreacted propylene was purged, the content in the autoclave was charged in 1000 ml of acidic methanol, and a polymer deposited was filtered for separation and dried at 80° C. for about 2 hours. As a result, 67 g of the polypropylene A-4 was obtained. Physical properties of the polypropylene A-4 are shown in Table 1.

REFERENCE EXAMPLE 5

(Production of propylene homopolymer (A-5))

After the atmosphere of a 1 liter stainless steel autoclave was replaced with argon and 280 g of propylene was charged thereto, 11.25 mmol of MMAO-3A was charged, then 2.25 mmol of water was charged and the mixture was stirred for 10 minutes. After 2.25 mmol of pentafluorophenol which was dissolved in 1.125 ml of purified toluene was charged and the mixture was stirred for 10 minutes, 7.5 $\mu$mol of bis(2-phenylindenyl)zirconium dichloride which was dissolved in 5 ml of purified toluene was charged in the autoclave, and polymerization was carried out at 40° C. for 1 hour. Then, 10 ml of methanol was charged in the autoclave under pressure, and the polymerization was terminated. Then, the unreacted propylene was purged, the content in the autoclave was charged in 1000 ml of acidic methanol, and a polymer deposited was filtered for separation and dried at 80° C. for about 2 hours. As a result, 63 g of the polypropylene A-5 was obtained. Physical properties of the polypropylene A-5 are shown in Table 1.

TABLE 1

|  | Mw (× 10⁴) | Mw/Mn | [η] (dl/g) | mmmm | Tm (° C.) | CXS (wt %) | BHIS (wt %) | BHIS [η] (dl/g) |
|---|---|---|---|---|---|---|---|---|
| A-1 | 38.0 | 2.6 | 2.4 | 0.400 | 146 | 66.5 | 5.4 | 3.9 |
| A-2 | 36.5 | 2.3 | 2.2 | 0.424 | 148 | 59.1 | 14.1 | 3.8 |
| A-3 | 38.9 | 2.4 | 2.4 | 0.453 | 148 | 55.9 | 20.6 | 3.6 |
| A-4 | 43.2 | 2.5 | 2.3 | 0.388 | 147 | 65.8 | 26.7 | 3.4 |
| A-5 | 22.8 | 2.3 | 1.5 | 0.335 | 148 | 76.7 | 12.0 | 3.3 | mmmm; Isotactic pentad fraction
CXS; 20° C. Xylene-soluble portion content
BHIS; Boiling heptane-insoluble portion
BHIS[η]; Intrinsic viscosity of boiling heptane-insoluble portion

REFERENCE EXAMPLE 6

(Production of propylene-based resin (B-1))

To 100 parts by weight of an ethylene-propylene block copolymer (intrinsic viscosity $[\eta]_p$ of the propylene homopolymer portion=0.8 dl/g, 20° C. xylene-soluble portion=0.10% by weight or less, isotactic pentad fraction of the propylene homopolymer portion=0.990; intrinsic viscosity $[\eta]_T$ of the total copolymer=1.60 dl/g, ethylene unit content=4.7% by weight, weight ratio X of the ethylene-propylene random copolymer portion to the total copolymer=17.3% by weight, intrinsic viscosity $[\eta]_{EP}$=5.4 dl/g), 0.15 parts by weight of calcium stearate as a stabilizer, 0.1 part by weight of 2,6-di-tert-butyl-4-hydroxytoluene and 0.05 part by weight of tetrakis[methylene-3(3',5'-tert-butyl-4-hydroxyphenyl) propionate]methane were added, and the mixture was pelletized using a continuous twin-screw kneader. Hereinafter, the propylene-based resin is described as PP1 in abbreviation.

PP1 and PP2 (isotactic propylene homopolymer; isotactic pentad fraction=0.983, MFR=100 g/10 min., intrinsic viscosity [η]=1.1 dl/g) were melt-kneaded so as to be a weight ratio of PP1/PP2=1:2 at a fixed temperature of 220° C. and a screw rotational speed of 50 rpm using VC20 manufactured by Tanabe Plastics Machine Co., Ltd. to obtain a composition. The amount of the propylene homopolymer portion in the composition is 94.2% by weight. Further, when the isotactic pentad fraction of the propylene homopolymer portion in the composition is calculated from the arithmetical mean of the isotactic pentad fraction of the propylene homopolymer portion of PP1 and the isotactic pentad fraction of PP2, it is 0.985. Similarly, the intrinsic viscosity of the propylene homopolymer portion in the composition is 1.0 dl/g from the arithmetical mean of the intrinsic viscosity of the propylene homopolymer portion in PP1 and the intrinsic viscosity of PP2. Hereinafter, the composition is described as B-1 in abbreviation.

EXAMPLES 1 to 5 AND COMPARATIVE EXAMPLE 1

After mixing the respective components by a Henschel mixer so as to be the compositions described in Table 2, they were melt-kneaded at a fixed temperature of 220° C. and a screw rotational speed of 50 rpm using VC20 manufactured by Tanabe Plastics Machine Co., Ltd. to obtain the compositions (further, PP1 was used as it was in Comparative Example 3). Their physical properties are described in Table 2.

The thermoplastic resin compositions in Examples of the present invention denoted a stable tensile elongation in comparison with that of Comparative Example. Further, it has a good balance in flowability, rigidity and tensile elongation, and is excellent.

TABLE 2

|  | Composition (% by weight) | | | | Density (g/cm³) | MFR (g/10 min.) | Flexural Modulus (kgf · cm/cm²) | Tensile elongation % |
|---|---|---|---|---|---|---|---|---|
| Example 1 | A-1 | 15 | B-1 | 85 | 0.9031 | 32.0 | 13500 | 535 |
| Example 2 | A-2 | 15 | B-1 | 85 | 0.9043 | 40.6 | 14400 | 247 |
| Example 3 | A-3 | 15 | B-1 | 85 | 0.9043 | 40.0 | 14200 | 398 |
| Example 4 | A-4 | 15 | B-1 | 85 | 0.9045 | 36.4 | 14500 | 232 |
| Example 5 | A-5 | 15 | B-1 | 85 | 0.9031 | 58.3 | 13800 | 213 |
| Comparative Example 1 | None | | PP1 | 100 | 0.9032 | 35.6 | 15900 | 169 The deviation of the measurement is large |

As described in detail above, according to the present invention, a thermoplastic resin composition having a good balance in flowability, rigidity and tensile elongation is provided, mainly using a propylene-based resin, and is useful for uses such as an automobile bumper and the like.

What is claimed is:

1. A thermoplastic resin composition comprising:

5 to 50% by weight of a propylene homopolymer (A) having an intrinsic viscosity measured in a tetralin solution at 135° C. of 1.2 dl/g or more, a boiling heptane-insoluble portion content of 5.0 to 50.0% by weight, and an intrinsic viscosity measured in a tetralin solution at 135° C. of the boiling heptane-insoluble portion of 4.3 dl/g or less, and 95 to 50% by weight of a propylene-based resin (B) which is a composition consisting of 65 to 95% by weight of a propylene homopolymer (B1) having an isotactic pentad fraction of 0.970 or more and 5 to 35% by weight of an ethylene-propylene random copolymer (B2), the total of (A) and (B) being 100% by weight.

2. The thermoplastic resin composition according to claim 1, wherein the intrinsic viscosity measured in a tetralin solution at 135° C. of the propylene homopolymer portion (B1) is 0.5 to 1.3 dl/g.

3. The thermoplastic resin composition according to claim 1, wherein the intrinsic viscosity in a tetralin solution at 135° C. of the ethylene-propylene random copolymer portion (B2) is 3.5 dl/g or more.

4. The thermoplastic resin composition according to claim 1, wherein the melting point of the propylene homopolymer (A) is 140 to 155° C.

5. The thermoplastic resin composition according to claim 1, wherein the isotactic pentad fraction of the propylene homopolymer (A) is 0.300 to 0.800.

6. The thermoplastic resin composition according to claim 1, wherein the molecular weight distribution (Mw/Mn) of the propylene homopolymer (A) is 3.0 or less.

7. The thermoplastic resin composition according to claim 1, wherein the 20° C. xylene-soluble portion content of the propylene homopolymer (A) is 20 to 80% by weight.

8. The thermoplastic resin composition according to claim 1, wherein the propylene homopolymer (A) is a propylene homopolymer obtained by homopolymerizing propylene in the presence of a catalyst for addition polymerization obtained by bringing a metallocene compound represented by the general formula [I] described below, into contact with an activating co-catalyst:

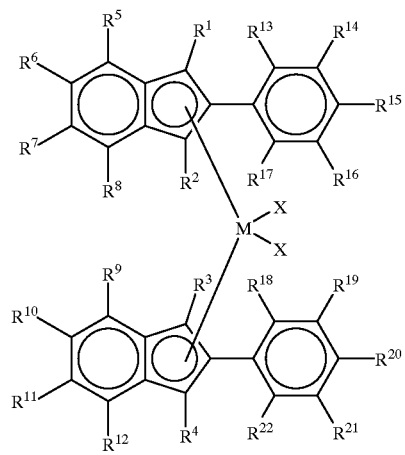

[I]

wherein each of $R^1$ to $R^{22}$ is independently a hydrogen atom, a halogen atom, an alkyl group, an aryl group, or an aralkyl group, $R^1$ to $R^{22}$ may be mutually the same or different, and arbitrary two adjacent $R^1$ to $R^{22}$ which are in the same ring may form a ring of 5 to 8 carbon atoms, M is a transition metal atom of the IV Group of the Periodic Table of Element, X is a hydrogen atom, a halogen atom, an alkyl group, an aryl group, an aralkyl group or an alkoxy group, and two X's may be the same or different.

9. The thermoplastic resin composition according to claim 1, wherein the melt flow index measured according to JIS-K-6758 at 230° C. under a load of 2.16 kg, is 30 to 100 g/10 min.

10. The thermoplastic resin composition according to claim 1, wherein the propylene homopolymer (A) is a propylene homopolymer obtained by homopolymerizing propylene in the presence of a catalyst for addition polymerization obtained by bringing a metallocene compound represented by the general formula [I] described below, into contact with an activating co-catalyst:

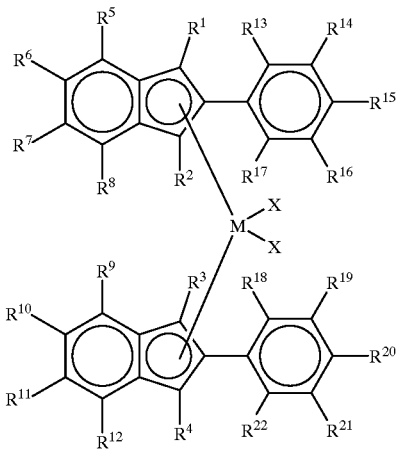

[I]

wherein each of $R^1$ to $R^{22}$ is independently a hydrogen atom, a halogen atom, an alkyl group, an aryl group, or an aralkyl group, mono-substituted silyl group having substituted with a 1–20 carbon atom hydrogen carbon group, a di-substituted silyl group substituted with two hydrocarbon groups having 2–20 carbon atoms, or a tri-substituted silyl group substituted with three hydrocarbon groups having 3–20 carbon atoms, $R^1$ to $R^{22}$ may be mutually the same or different, and arbitrary two adjacent $R^1$ to $R^{22}$ which are in the same ring may form a ring of 5 to 8 carbon atoms M is a transition metal atom of the IV Group of the Periodic Table of Element, X is a hydrogen atom, a halogen atom, an alkyl group, an aryl group, an aralkyl group or an alkoxy group, and two X's may be the same or different.

11. A thermoplastic resin composition according to claim 1, wherein the propylene homopolymer (A) is a propylene homopolymer obtained by homopolymerizing propylene in the presence of a catalyst for addition polymerization obtained by bringing a metallocene compound represented by the general formula [I] described below, into contact with an co-catalyst:

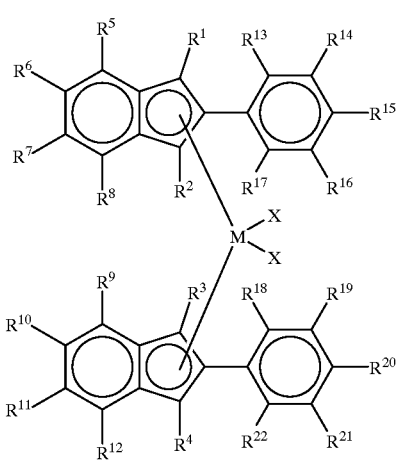

[I]

wherein each of $R^1$ to $R^{22}$ is independently a hydrogen atom, a halogen atom, an alkyl group, an aryl group, or an aralkyl group, a tri-methyl silyl group, a tert-butyl-di-methyl silyl group, or a tri-phenyl silyl group $R^1$ to $R^{22}$ may be mutually the same or different, and arbitrarily two adjacent $R^1$ to $R^{22}$ which are in the same ring may form a ring of 5 to 8 carbon atoms M is a transition metal atom of the IV Group of the Periodic Table of Element, X is a hydrogen atom, a halogen atom, an alkyl group, an aryl group, an aralkyl group or an alkoxy group, and two X's may be the same or different.

* * * * *